(12) United States Patent
Frugier et al.

(10) Patent No.: US 6,506,496 B1
(45) Date of Patent: *Jan. 14, 2003

(54) COMPOSITION FOR PROVIDING A NON-WETTABLE COATING, ARTICLES COATED THEREWITH, AND METHODS FOR PREPARING THE SAME

(75) Inventors: Dominique Frugier, Romainville (FR); Pascal Chartier, Orsay (FR); Philippe Vaneeckhoutte, Meaux (FR); Yves Leclaire, Combs la Ville (FR); Anne Robert, Creteil (FR)

(73) Assignee: Saint-Gobain Glass France, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/412,573

(22) Filed: Mar. 29, 1995

(30) Foreign Application Priority Data

Mar. 29, 1994 (FR) .............................................. 94 03689

(51) Int. Cl.⁷ .................................................. B32B 9/04
(52) U.S. Cl. ........................ 428/447; 427/387; 528/42; 524/837; 524/858; 524/868
(58) Field of Search ............................. 528/42; 524/858, 524/868, 837; 428/447; 427/387

(56) References Cited

U.S. PATENT DOCUMENTS 4,525,421 A * 6/1985 Kubota et al. .............. 428/412
4,732,787 A * 3/1988 Vantillard et al. ........... 427/386
4,914,143 A * 4/1990 Patel .......................... 522/148
4,978,702 A * 12/1990 Yuyuma et al. ............. 524/266
5,290,900 A * 3/1994 Kobayashi .................... 528/26
5,322,888 A * 6/1994 Kato et al. .................. 524/783

OTHER PUBLICATIONS

Yoshino et al., "Synthesis and Reactions of Metal Organics. XVIII." Bull. Chem. Soc. Jpn., 66, 1754–1758 (1993).*

* cited by examiner

Primary Examiner—Margaret G. Moore
(74) Attorney, Agent, or Firm—Oblon, Spivak, McClelland, Maier & Neustadt, P.C.

(57) ABSTRACT

A heat-settable composition for a coating which is hydrophobic, oleophobic and resistant to abrasion, wherein the coating contains a hydrolyzate obtained from a solution of:

one or more epoxidized alkoxysilane having alkoxy groups which are directly linked to the silicon atom;

a hydrolyzable, non-epoxidized silane;

colloidal silica;

a catalyst which promotes cleavage of an epoxy bond; and at least one fluorinated hydrolyzable alkylsilane; and the use of the heat-settable composition in the preparation of a coated substrate of organic glass or mineral glass material, coated with a coating obtained from the heat-settable composition, with the substrate preferably being a pane (comprised of glass or a polymeric material) or an ophthalmic lens.

19 Claims, No Drawings

COMPOSITION FOR PROVIDING A NON-WETTABLE COATING, ARTICLES COATED THEREWITH, AND METHODS FOR PREPARING THE SAME

BACKGROUND OF THE INVENTION

1. Field of the Invention

The present invention relates to a composition for providing a "non-wettable" coating, and a method of preparing the same. The invention also relates to articles coated with such a composition, and methods for their preparation.

2. Discussion of the Background

In the context of the present invention the term "wettability" refers to the adherence of polar or nonpolar liquids to articles to form a detrimental film; and refers also to the tendency of the articles to retain dusts and soils of all types—e.g., fingerprints, insect remnants, etc.

The presence of water and/or soils on the articles confers an unattractive appearance. Additionally this can cause changes in the ability to see through the articles and diminishes their transparency, which is particularly detrimental in the case of vehicle and aircraft panes and ophthalmic lenses.

Various types of non-wettable coatings are known.

One known coating can be obtained from fluorinated organosilanes, such as that described in EP 492,545. Another known coating can be obtained from a mixture of a perfluoroalkylsilane and an olefinic fluorinated telomer, as described in EP 452,723.

However, it turns out that the non-wettability of these coatings is subject to thermal degradation. This is a particular problem with vehicle panes which, in addition to ordinary aging effects from various factors, such as atmospheric conditions (humidity and sunlight or other light), are subjected to substantial abrasion, particularly from the impact of particles, such as directly or indirectly from the rubbing of windshield wipers, washing rags, or cleaning squeegees, or violent impingements which may occur.

In order to improve resistance to abrasion, EP 548,775 proposes coatings of the polysilane type having bonds of the type —Si—O—Si— and containing fluorinated groups.

However, the nature of these coatings leads to glass panes and the like which are not satisfactory for prolonged use.

SUMMARY OF THE PRESENT INVENTION

Accordingly, one object of the present invention is to provide an article covered with a non-wettable coating which provides improved abrasion resistance and particularly which has non-wettability which is preserved in the face of abrasion.

A further object of the present invention is to provide a method for the production of an article having a non-wettable coating as noted above.

A further object of the present invention is to provide a heat-settable composition which can be used to prepare a hydrophobic, oleophobic, abrasion resistant coating, suitable for application to substrates such as glass or polymeric ophthalmic lenses.

These and other objects of the present invention have been satisfied by the discovery of a heat-settable composition for a coating which is hydrophobic, oleophobic and resistant to abrasion, comprising a hydrolyzate obtained from a solution comprising:

one or more epoxidized alkoxysilane having alkoxy groups which are directly linked to the silicon atom;

a hydrolyzable, non-epoxidized silane;

colloidal silica;

a catalyst which promotes cleavage of an epoxy bond; and at least one fluorinated hydrolyzable alkylsilane; and its use in coating substrates and a method for preparing such a coating.

DETAILED DESCRIPTION OF THE PREFERRED EMBODIMENTS

The present invention relates to a heat-settable composition for a coating, wherein the coating is hydrophobic, oleophobic and resistant to abrasion, comprising a hydrolyzate obtained from a solution comprising:

one or more epoxidized alkoxysilanes in which the alkoxy groups are directly linked to the silicon atom;

a hydrolyzable, non-epoxidized silane;

colloidal silicon;

a catalyst; and one or more fluorinated hydrolyzable alkylsilanes.

The fluorinated alkylsilanes used in the coating of the resent invention are preferably perfluoroalkylsilanes having fluorine atoms at the end of their chains. The presence of the fluorines at the end of the chains is believed to provide the enhancement of the hydrophobic and oleophobic properties of the coating.

The fluorinated alkylsilanes, preferably have the formula (I):

$$CF_3-(CF_2)_n-(CH_2)_m-SiX_3 \qquad (I)$$

where n is in the range 0–12;

m is in the range 2–5; and

X represents a hydrolyzable moiety.

X is preferably chosen from among chlorine (Cl), hydrogen (H), acyloxy groups, and, preferably, alkoxy groups having 1–10 C atoms.

Most preferably, the fluorinated alkylsilanes are chosen from among the perfluoroalkyl alkoxysilanes, and in particular the following:

$$CF_3-(CF_2)_5-(CH_2)_2-Si(OR)_3, CF_3-(CF_2)_7-(CH_2)_2-Si(OR)_3, CF_3-(CF_2)_9-(CH_2)_2-Si(OR)_3,$$

where R represents a methyl, ethyl, or propyl group.

The epoxidized alkoxysilanes used preferably have formula II:

$$\underset{O}{\underset{\diagdown\diagup}{CH_2-CM}}-CH_2-O-(CH_2-CH_2-O)_r-(CH_2)_s-Si(OM)_{3-p} \atop M''_p \qquad (II)$$

wherein p is 0 or 1, r is 0, 1, or 2,

S is an integer in the range from 1–6,

M represents H or an alkyl group having 1 to 4 C atoms, and

M' and M" represent alkyl groups having 1 to 3 C atoms.

Suitable examples of epoxidized alkoxysilanes include:

gamma-glycidoxypropyl-trimethoxysilane, gamma-glycidoxypropyl-methyl-dimethoxysilane, and gamma-glycidoxypropyl-methyl-diethoxysilane.

The non-epoxidized silanes used preferably have the formula III

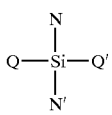

(III)

wherein N and N' are organic groups connected to the silicon atom by a Si—C bond, which groups do not comprise any group which reacts with the hydrolyzed silanes present in the composition, and Q and Q' are hydrolyzable moieties.

Q and Q' are each independently, selected from among chlorine (Cl), hydrogen (H), acyloxy groups, and, alkoxy groups having 1–10 C atoms, with Q and Q' preferably being epoxy groups having 1–10 C atoms.

The groups N and N' in the silanes of formula III do not have groups which will react with the hydrolyzed silanes present in the compound, such as SiOH, nor do they have bridging (or crosslinking) groups such as epoxy groups.

Preferably, the groups N and N' are each, independently, selected from alkyl groups having 1–10 C atoms and aryl groups having 6–10 C atoms, such as the phenyl group.

Examples of silanes of Formula III include dimethyldimethoxysilane;

dimethyldiethoxysilane; and methyl-phenyl-dimethoxysilane.

The catalyst used in the present invention is a catalyst which promotes cleavage of the epoxy bond, chosen from among the chelates of aluminum and the compounds of formulas IV and V:

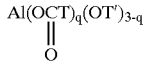
(IV)

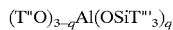
(V)

where T, T', and T" are linear or branched-chain alkyl groups having 1–10 C atoms;

T''' is a linear or branched-chain alkyl group having 1–10 C atoms, or a phenyl group, or a group

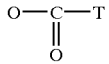

where T has the same meaning as above, and q is an integer in the range from 1–3.

If the aluminum compound is a chelate of aluminum, the composition preferably comprises an organic solvent having a boiling point in the range 70–140° C. at atmospheric pressure. Such solvents include ethanol, isopropanol, ethyl acetate, methyl ethyl ketone, or tetrahydropyran.

Such solvents may also be employed if the catalyst is a catalyst according to formula IV or V.

The compositions of the present invention may also comprise other organic solvents, preferably alcoholic, such as methanol, serving to adjust the viscosity of the given composition.

The term "chelate of aluminum", as used herein, designates a compound formed by reacting an aluminum alkoxy-late or aluminum acylate with sequestering agents which do not contain nitrogen or sulfur but do contain oxygen as a coordination atom. An example of a chelate of aluminum is a compound of formula VI:

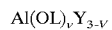
(VI)

where v is 0, 1, or 2,

L represents an alkyl group with 1–10 C atoms, and

Y is a ligand produced from compounds of formula (1) or (2):

 (1)

 (2)

where $R^1$, $R^2$, $R^3$, and $R^4$ are alkyl groups having 1–10 C atoms.

Suitable examples of compounds of formula VI include aluminum acetylacetonate, aluminum ethylacetoacetate bis (acetylacetonate), aluminum bis(ethylacetoacetate) acetylacetonate, aluminum di-n-butoxide monoethylacetoacetate, and aluminum monomethylacetoacetate dipropoxide.

Preferably, compounds of formula IV and V include those in which

T' and T" each represent an isopropyl or ethyl group, and

T and T''' each represent a methyl group.

The catalyst used may comprise one or more compounds of formulas IV, V and/or VI.

The catalyst is used in an amount sufficient to provide cleavage of the epoxy bond at a rate such that the compositions of the present invention will cure in a time on the order of a few to several hours, preferably 2 to 7 hours, at temperatures in the range of 60–200° C. Preferably the catalyst is used in an amount of from 0.1–5.0 wt. % (based on the total weight of the solution).

The desired hydrophobic and oleophobic properties are obtained in the coatings of the present invention by the presence of fluorosilanes in which the fluorines are at the end of the chain opposite to that by which they are crosslinked. This structure further contributes to strong bonding to the crosslinkage system, thereby improving resistance to abrasion.

According to the present invention, the coating is obtained from a hydrolyzate of the polysiloxane type, having reactive groups.

The hydrolyzate is obtained by hydrolysis and prepolymerization of functionalized organosilanes, particularly epoxidized alkoxysilanes, non-epoxidized silanes, fluorinated alkylsilanes, and colloidal silica, preferably via silanol and epoxy functional groups.

The presence of epoxidized silanes and colloidal silica in the composition leads to coatings wherein crosslinking enables the improved properties, such as improved abrasion resistance, to be achieved. The improved abrasion resistance can be attributed at least in part to peculiarities in the structure of the epoxidized alkoxysilanes. In particular, they have at least three reactive groups, with at least one at each end, whereby the two ends of the carbon chain become linked to respective silicon atoms while producing at least three Si—O bonds. However, the invention is not dependent upon this hypothesis.

The use of silanes having two reactive groups enables production of a coating which has appreciable hardness and thus resistance to abrasion, but without excessive rigidity which could lead to cracking.

The amount of fluorinated alkylsilanes in relation to the other constituents present in the coating, including the epoxidized alkoxysilanes, the non-epoxidized silanes, and the colloidal silica, is preferably in the range from 0.1–6.0 wt. %, most preferably from 0.1–4.0 wt. % (based on the dry matter content of the composition). Even though the amount of fluorinated components is small, the coating has satisfactory hydrophobicity and oleophobicity. By contrast, in coatings according to the prior art, the ratio of the fluorinated components to the other constituents present in the coating was appreciably greater, adding to the expense of the coating without offering any increased hydrophobicity in the resulting product.

The amount of epoxidized alkoxysilanes in the theoretical dry matter is preferably greater than 30%. A lower figure leads to a coating with reduced abrasion resistance.

The amount of non-epoxidized silane in the theoretical dry matter of the composition is preferably in the range of 5–20 wt. %, more preferably 8–16 wt. %, and most preferably 10–15 wt. %. The relative amount of non-epoxidized silanes in the coating particularly affects the impact-resistance of the coating.

The amount of colloidal silica should be least 40% of the theoretical dry matter in the present compositions in order to achieve the best properties; with an amount on the order of 50% being preferred. The weight of colloidal silica is deemed to be the weight of $SiO_2$. Amounts greater than 50% lead to cracking in the coating, and amounts less than 40% give relatively low abrasion resistance.

The amount of constituent A is defined as the weight calculated in units of $$Q_k SiO_{(4-H)}/2,$$

where Q is an organic group linked directly to the Si atom by a Si—C bond, and k is 0, 1, or 2;

and the $Q_k SiO_{(4-R)}/2$, which is derived from $Q_k SiR'$ or Si—R', gives SiOH by hydrolytic treatment.

The theoretical weight of dry matter is the total calculated weight of solid materials coming from the epoxidized alkoxysilane(s), non-epoxidized silane(s), colloidal silica, and catalyst.

In practice the theoretical dry matter corresponds closely to the measured dry matter.

Preferably the coating is obtained from a solution having the following formulation (percentages given are on a dry matter basis of the solution):

30–50 wt. % of one or more epoxidized alkoxysilanes;
30–55 wt. % of colloidal silica;
10–20 wt. % of hydrolyzable non-epoxidized silane;
0.1–6.0 wt. % of one or more hydrolyzable fluorinated alkylsilanes; and
0.1–5.0 wt. % of catalyst.

According to a preferred embodiment, the coating is obtained from a solution having the following formulation (percentages given are on a dry matter basis of the solution):

35–40 wt. % of one or more epoxidized alkoxysilanes;
40–55 wt. % of colloidal silica;
10–15 wt. % of hydrolyzable non-epoxidized silane;
0.1–4.0 wt. % of one or more hydrolyzable fluorinated alkylsilanes; and
0.1–5.0 wt. % of catalyst.

According to a particularly preferred embodiment, the coating is obtained from a solution having the following formulation (percentages given are on a dry matter basis of the solution):

35–40 wt. % of glycidoxypropyl-trimethoxysilane;
40–55 wt. % of colloidal silica;
10–15 wt. % of dimethyldiethoxysilane;
0.1–4.0 wt. % of one or more perfluoroalkyl alkoxysilanes selected from the group of perfluoroalkyl alkoxysilanes according to the following formulas:

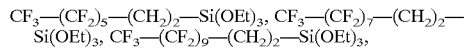

and 0.1–5.0 wt. % aluminum acetylacetonate.

Other components may be added to the solution, such as a surfactant to improve wettability (with respect to the solution) of the substrate intended to be coated. Suitable surfactants include silicone surfactants, or fluorinated surfactants. Other additives which may optionally be added include catalysts to accelerate linking and crosslinking, antioxidants, pigments, UV-absorbers, or any other component intended to improve or confer certain properties on the resulting pane, as long as they do not detrimentally affect the desired properties of the composition of the present invention.

The method of producing the coating of the present invention has been found to influence its structure and thus its properties.

It is preferable to carefully control the water needed for hydrolysis. This controlled quantity of water may be introduced in the mixture in the form of pure water or as a solution, such as an acid solution.

The hydrolysis may also be carried out without addition of water, i.e. employing only the water molecules resulting from the condensation reactions. It is important to note that the quantity of water present has a direct influence on the polymerization of the alkoxysilanes. The greater the amount of water present, the more dense the crosslinking system and thus the more resistant to abrasion. If the crosslinking network is too dense however, there is a risk of cracking, as well as excessive viscosity which causes problems in applying the solution to the substrate. Thus, a compromise should be found.

According to one preferred embodiment, an acid solution is added to the initial alkoxysilanes, which solution comprises a stoichiometric amount of water with respect to the silanol groups of the epoxidized alkoxysilane and of the non-epoxidized alkoxysilane. Further, the silica is preferably introduced as a suspension in an alcoholic solution, without addition of supplementary water. If desirable, solvents may also be added for the purpose of adjusting the viscosity of the solution when the solution is applied to the substrate.

One method of producing the present coating comprises the following steps:

hydrolyzing and partially condensing one or more epoxidized alkoxysilanes and a non-epoxidized silane, adding colloidal silica and a catalyst, either separately or simultaneously, and adding one or more fluorinated alkylsilanes, during hydrolysis or condensation of the alkoxysilanes, or during both hydrolysis and condensation.

In carrying out these various stages, it is important to avoid secondary reactions which might tend to occur.

In this connection, fluorinated alkyl-alkoxysilanes are preferable to fluorinated alkylsilanes in which the hydrolyzable group is a halogen, such as a chlorine, because of the advantage of avoidance of inter-reactions of fluorinated alkylsilanes. Moreover, the HCl liberated in such a reaction can modify the solution pH and thus the operating conditions.

The method is described in more detail below:

First, a hydrolyzate of the epoxidized alkoxysilane and the non-epoxidized silane is formed in the presence of an acid solution containing a stoichiometric amount of acid with respect to silanol groups of the two silanes. The one or more fluorinated alkylsilanes are introduced prior to, during, or following the introduction of the non-epoxidized alkoxysilane. Then the other components are introduced, in particular the colloidal silica and a catalyst capable of cleaving the epoxy bond. In order to better control the amount of water present, the silica is in suspension in an alcoholic solution. The diameters of the silica particles are preferably in the range 10–20 nm.

According to a preferred embodiment, a delay of several hours is used prior to addition of the other components. (The silica can be added before or after this delay period.)

The viscosity of the solution obtained is in the range of 1–6 cps.

After preparation of at least one of the substrate surfaces, the substrate is contacted with the solution containing at least one epoxidized alkoxysilane, a non-epoxidized alkoxysilane, the colloidal silica, a catalyst, and at least one fluorinated alkylsilane. During this step the solvents begin to evaporate, such that the solution forms a gel. This gel is then crosslinked.

The substrate preparation stage is important because it determines the number of reactive sites on the substrate which can react with the alkoxysilanes and (possibly) the fluorinated organosilanes, with these components forming the non-wettable coating.

One object of the preparation process is to eliminate all essentially organic contaminants adsorbed on the substrate surface. Such contaminants are apt to be detrimental to the eventual reaction of the alkoxysilanes on the reactive sites of the substrate.

Treatment of the substrate is carried out by contacting the substrate with the solution. Any means may be used for accomplishing this, such as film casting, spray coating, centrifugation, immersion coating, dipping, or roll coating. The coating is carried out such that the thickness of the coating after crosslinking meets the specifications for the coated article. For example, the coating thickness must be such that it does not change the optical properties of the pane, but does confer the desired hydrophobicity, oleophobicity, and abrasion resistance. Preferably the thickness is in the range of 0.1–10.0 micron, more preferably 0.1–4.0 micron.

Crosslinking of the gel is brought about by heating at least 1 hr at a temperature in the range of 60–200° C.

The types of substrates which can be coated may be glass (whether or not subjected to thermal tempering or chemical quenching), such as glass produced by the "float process". This glass may have been coated with an initial coating of mineral material, e.g. based on tin oxide or ITO. The substrate may also be comprised of polymer material, such as polycarbonate polymers or copolymer, which has been coated with a mineral coating, such as a coating comprising $SiO_2$.

The glass panes used as a substrate in the present invention include those used, in particular, in the aeronautical and automotive areas, but they may be those used in the building area or in interior architecture and decorating, such as in decorative panels or in furniture pieces.

Having generally described this invention, a further understanding can be obtained by reference to certain specific examples which are provided herein for purposes of illustration only and are not intended to be limiting unless otherwise specified.

EXAMPLES

Example 1

Example 1 illustrates the hydrophobic character of the composition according to the invention. Two solutions were prepared:

One solution comprised fluorinated organosilanes in the amount of 0.2%;

The second comprised fluorinated organosilanes in the amount of 1%.

These solutions were prepared as follows: An HCl solution was introduced dropwise into a solution containing glycidoxypropyl-trimethoxysilane and dimethyldiethoxysilane; then the fluorinated organosilanes were added.

The solution was agitated 24 hr at ambient temperature, after which a suspension containing 30% colloidal silica in ethanol, aluminum acetylacetonate, methyl ethyl ketone, and a silicone surfactant were introduced. The proportions were as follows:

|  | Solution 1 | Solution 2 |
| --- | --- | --- |
| Glycidoxypropyl-trimethoxysilane | 18.6 | 18.5 |
| HCl, 0.1N | 6.6 | 6.6 |
| Dimethyldiethoxysilane | 9.7 | 9.6 |
| Fluorinated organosilane | 0.2 | 1 |
| $SiO_2$ in solution in ethanol | 60.6 | 59.4 |
| Aluminum acetylacetonate | 1.2 | 1.2 |
| Methyl ethyl ketone | 3.6 | 3.6 |
| Surfactant | 0.1 | 0.1 |

Two substrates comprising mineral glass produced by the "float process" were cleaned by immersing them first in a solution containing a surfactant and then in a basic solution, followed by rinsing and drying.

Solutions 1 and 2 were applied on substrates 1 and 2, respectively, by dip coating. In the course of the application, the solvents, (ethanol and the methyl ethyl ketone), began to evaporate, such that the solution formed a gel.

The substrate coated with the coating was then heated 3 hr at 100° C. The resulting coating was 3 microns thick.

The contact angles measured with water on the treated glass were 104° for substrate 1 and 102° for substrate 2.

This example illustrates the hydrophobic character of the coatings obtained according to the invention.

Example 2

Example 2 illustrates the abrasion resistance of the inventive coatings applied to a mineral glass substrate.

Three samples of a third substrate comprised of mineral glass produced by the "float process" were tested.

These were coated with solution 2 of Example 1.

They were heated 1 hr at 100° C. The resulting coatings were approximately 3 microns thick.

The mean value of the initial contact angle of water on the samples was 104°.

One sample was subjected to a test known as the Taber test, according to ASTM 1044-78. It was abraded by a rotating grinding wheel of type CS-10F, under a load of 500 g. Following 100 rotations, the contact angle of water measured on substrate 3 was 90°.

The second sample was immersed 2 hr in boiling water The contact angle of water measured on the substrate was 102°.

The third sample was immersed 4 hr in boiling water. The contact angle of water on the substrate was 92°.

This example illustrates the abrasion resistance of the inventive coating on mineral glass substrates.

Example 3

Solution 2 described in Example 1 was used to coat, by a centrifugation technique (1500 rpm), "Orma" ophthalmic lenses of organic glass comprised of a polymer of diethylene glycol di-alkylcarbonate.

The lenses were then heated 3 hr at 100° C.

The coating thickness was 2.75 microns.

In order to measure the abrasion resistance, the Bayer test according to ASTM F735-B1 was used. A high value in the Bayer test corresponds to a high resistance to abrasion.

The value measured on the coating was 2.94.

The scratch resistance was measured by the steel wool test:

Extra Fine No. 000 Starwax steel wool was used;

Using a piece of steel wool of dimensions c. 3×3 cm, which piece was folded over on itself, 10 back and forth movements were performed in which the steel wool was rubbed against the coated glass in the direction of the fibers of the steel wool, with a constant pressure exerted during the rubbing.

The glass was then wiped with a dry cloth, followed by rinsing with ethanol.

The condition of the glass was then evaluated visually, according to the following scoring scheme:

0 No scratches observed;
1 Very little scratching of the glass (0–5 scratches);
2 Moderate scratching (up to 20 scratches);
3 Substantial scratching (up to 50 scratches);
4 High degree of scratching (more than 50 scratches);
5 Glass equivalent to or inferior to the original substrate (Orma).

The score given to the coating was 0.5–1.

This example illustrates the abrasion resistance of the coating on a substrate comprising organic glass.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coated substrate comprising a substrate of organic glass or mineral glass material, having a coating which is hydrophobic, oleophobic and resistant to abrasion, wherein the coating is obtained, from a composition comprising a hydrolyzate obtained from a solution, by a method comprising the steps:

hydrolyzing and partially condensing one or more epoxidized alkoxysilanes and a non-epoxidized silane;

adding, separately or simultaneously, colloidal silica and a catalyst; and adding one or more fluorinated alkylsilanes, present in an amount of from 0.1–6.0 wt % based on total dry matter in the solution, during the hydrolysis or partial condensation of the silanes or during both the hydrolysis and partial condensation of the silanes; wherein the fluorinated alkylsilane is perfluoroalkylsilane having the formula (I):

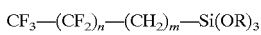 (I)

wherein n is 5–12, m is 2–5, and R represents a methyl, ethyl, or propyl group, eliminating essentially all organic contaminants adsorbed on the surface of the substrate, depositing said composition on said substrate, evaporating solvents from said composition to thereby form a gel, and crosslinking said gel, and wherein the solution has a viscosity in the range of 1–6 cps.

2. The coated substrate of claim 1, wherein the perfluoroalkylsilane is a member selected from the group consisting of the perfluoroalkyl alkoxysilanes according to the following formulas:

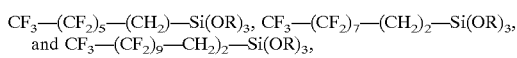

wherein R represents a methyl, ethyl, or propyl group.

3. The coated substrate of claim 1, wherein the fluorinated alkylsilane is present in an amount of from 0.1–4.0 wt % based on total dry matter in the solution.

4. The coated substrate of claim 1, wherein the epoxidized alkoxysilane has the formula (II):

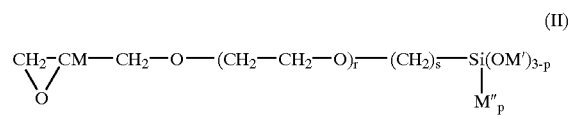 (II)

wherein p is 0 or 1, r is 0 1, or 2, s is an integer in the range 1–6,

M represents H or an alkyl group having 1 to 4 C atoms, and

M' and M" represent alkyl groups having 1 to 3 C atoms; and the non-epoxidized silane has the formula (III):

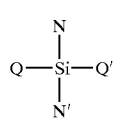 (III)

where N and N' are organic groups connected to the silicon atom by a Si—C bond, which groups do not comprise any group which reacts with hydrolyzed silanes present in the composition, and Q and Q' are hydrolyzable moieties.

5. The coated substrate of claim 1, wherein the epoxidized alkoxysilane is a member selected from the group consisting of:

gamma-glycidoxypropyl-trimethoxysilane;
gamma-glycidoxypropyl-triethoxysilane,
gamma-glycidoxypropyl-methyl-dimethoxysilane, and
gamma-glycidoxypropyl-methyl-diethoxysilane.

6. The coated substrate of claim 1, wherein the non-epoxidized alkoxysilane is a dialkoxysilane wherein the groups N and N' are each, independently, selected from the group consisting of alkyl groups having 1–10C atoms and aryl groups having 6–10C atoms.

7. The coated substrate of claim 1, wherein the catalyst is a chelate of aluminum.

8. The coated substrate of claim 1, wherein the solution further comprises a silicon surfactant or a fluorinated surfactant.

9. The coated substrate of claim 1, wherein the composition comprises a hydrolyzate obtained from a solution comprising:
30–50% of one or more epoxidized alkoxysilanes,
30–55% of colloidal silica,
10–20% of a non-epoxidized hydrolyzable silane;
0.1–6.0% of one or more fluorinated hydrolyzable alkylsilanes; and
0.1–5.0% of a catalyst, the percentages given being percentages by weight with respect to the dry matter of the solution.

10. The coated substrate of claim 1, wherein the composition comprises a hydrolyzate obtained from a solution comprising:
35–40% of one or more epoxidized alkoxysilanes;
40–55% of colloidal silica;
10–15% of a non-epoxidized hydrolyzable alkoxysilane,
0.1–4.0% of one or more fluorinated hydrolyzable alkylsilanes; and
0.1–5.0% of a catalyst, the percentages given being percentages by weight with respect to the dry matter of the solution.

11. The coated substrate of claim 1, wherein the composition comprises a hydrolyzate obtained from a solution comprising:
35–40% of glycidoxypropyl-trimethoxysilane;
40–55% of colloidal silica;
10–15% of dimethyldiethoxysilane;
0.1–4% of one or more perfluoroalkyl alkoxysilanes selected from the group consisting of perfluoroalkyl alkoxysilanes according to the following formulas:

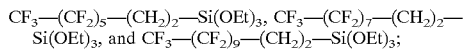

$CF_3$—$(CF_2)_5$—$(CH_2)_2$—$Si(OEt)_3$, $CF_3$—$(CF_2)_7$—$(CH_2)_2$—$Si(OEt)_3$, and $CF_3$—$(CF_2)_9$—$(CH_2)_2$—$Si(OEt)_3$;

and
0.1–5.0% of aluminum acetylacetonate.

12. The coated substrate of claim 1, wherein the substrate is a pane comprised of glass or a polymeric material.

13. A pane according to claim 12, wherein the coating has a thickness in the range 0.1–10.0 micron.

14. The coated substrate according to claim 1, wherein the substrate is an ophthalmic lens.

15. A method of fabricating a substrate pane comprised of glass or polymeric material, and having a coating which is hydrophobic, oleophobic and resistant to abrasion, wherein the method comprises the steps:
preparing at least one of the faces of the substrate thereby eliminating essentially all organic contaminants adsorbed on the surface of the substrate;
contacting the prepared face of the substrate with a solution comprising:
one or more epoxidized alkoxysilanes,
a non-epoxidized hydrolyzable silane, colloidal silica, a catalyst, and
at least one fluorinated hydrolyzable alkylsilane, present in an amount of from 0.1–6.0 wt % based on a total dry matter in the solution,
wherein the fluorinated alkylsilane is perfluoroalkylsilane having the formula (I):

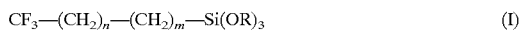

$CF_3$—$(CH_2)_n$—$(CH_2)_m$—$Si(OR)_3$ (I)

wherein n is 5–12, m is 2–5, and R represents a methyl, ethyl, or propyl group;

wherein the solution forms a gel; and
crosslinking of the gel formed on the substrate,
wherein the solution has a viscosity in the range of 1–6 cps.

16. A method according to claim 15, wherein the crosslinking of the gel is brought about by maintaining the gel at a temperature in the range of 60–200° C. for at least one hour.

17. A method of producing a coating on a substrate which is hydrophobic, oleophobic and resistant to abrasion, wherein the method comprises the steps of forming a composition comprising a hydrolyzate obtained from a solution by:
hydrolyzing and partially condensing one or more epoxidized alkoxysilanes and a nonepoxidized silane;
adding, separately or simultaneously, colloidal silica and a catalyst; and
adding one or more fluorinated alkylsilanes, present in an amount of from 0.1–6.0 wt. % based on total dry matter in the solution, during the hydrolysis or partial condensation of the silanes or during both the hydrolysis and partial condensation of the silanes;
wherein the fluorinated alkylsilane is perfluoroalkylsilane having the formula (1):

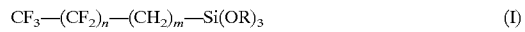

$CF_3$—$(CF_2)_n$—$(CH_2)_m$—$Si(OR)_3$ (I)

wherein n is 5–12, m is 2–5, and R represents a methyl, ethyl, or propyl group,
eliminating essentially all organic contaminants adsorbed on the surface of the substrate, and
depositing said composition on said substrate,
and wherein the solution has a viscosity in the range of 1–6 cps.

18. A method according to claim 17, wherein the hydrolysis of the epoxidized and non-epoxidized silanes is obtained by adding an acidic solution in a stoichiometric amount with respect to the silanol groups of the silanes.

19. A method according to claim 18, wherein the on or more epoxidized alkoxysilanes have the formula (II):

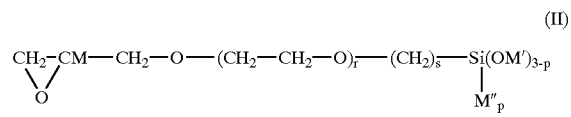

(II)

$CH_2$–$CM$—$CH_2$—$O$—$(CH_2$—$CH_2$—$O)_r$—$(CH_2)_s$—$Si(OM')_{3-p}$
\\ /
O
$M''_p$ wherein p is 0 or 1,
r is 0, 1, or 2,
s is an integer in the range 1–6,
M represents H or an alkyl group having 1 to 4 C atoms; and
M' and M" represent alkyl groups having 1 to 3 C atoms;
the non-epoxidized alkoxysilane has the formula (II):

(III)

N
|
Q—Si—Q'
|
N' wherein N and N' are each, independently, alkyl groups having 1–10 C atoms or aryl groups having 6–10 C atoms, and
Q and Q' are hydrolyzable moieties.

* * * * *